A. Gordon,
Metal Drill,
N°. 42,365. Patented Apr. 19, 1864.
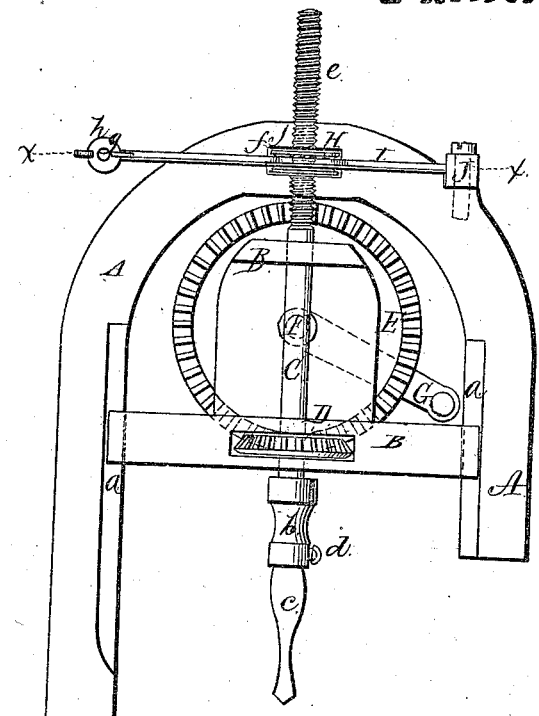
Fig. 1.
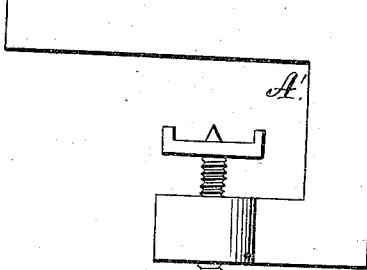
Fig. 2.
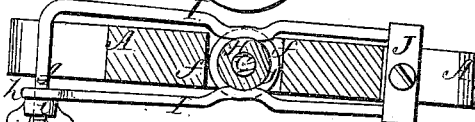
Witnesses:
J. P. Hall
Geo. B. Reed
Inventor,
Alexander Gordon

UNITED STATES PATENT OFFICE.

ALEXANDER GORDON, OF NEW YORK, N. Y.

IMPROVEMENT IN DRILLING-MACHINES.

Specification forming part of Letters Patent No. 42,365, dated April 19, 1864.

*To all whom it may concern:*

Be it known that I, ALEXANDER GORDON, of the city, county, and State of New York, have invented a new and useful Improvement in Drilling-Machines; and I do hereby declare that the following is a full, clear, and exact description of the same, reference being had to the accompanying drawings, forming a part of this specification, in which—

Figure 1 is a vertical section of a drilling-machine with my improvements. Fig. 2 is a horizontal section of the same in the plane indicated by the line $x\, x$ in Fig. 1.

Similar letters of reference indicate corresponding parts in both figures.

This invention relates to the mode of feeding the drill; and it consists in controlling the feed by means of an adjustable friction-clamp applied to a nut, which is fitted to a screw-thread on the rotating spindle which carries the drill-stock.

To enable others skilled in the art to make and use my invention, I will proceed to describe its construction and operation.

A is the frame of the machine, which may be erected upon a suitable stationary base or made with a screw-clamp, A', by which to attach it to a bench or to the piece of work to be drilled, as shown in Fig. 1. In this frame there are provided straight guides $a\, a$ for a sliding gate, B, which contains the bearings for the rotating drill-spindle C, at the lower end of which is the drill-stock $b$, in which the drill $c$ is secured by a set-screw, $d$, or other suitable means. On the upper part of the spindle C there is cut a screw-thread, $e$, and on the lower part there is secured a bevel-gear, D, which gears with a bevel-gear, E, on a shaft, F, which works in suitable bearings in the gate B, and which has rotary motion imparted to it to produce the rotation of the drill-spindle by a handle, G, or other suitable means.

H is the feeding-nut fitted to the screw-thread $e$ on the drill-spindle, and so arranged within a slot, $f$, in the upper part of the frame A that, although it is free to rotate, it is not permitted to move in the direction of its axis. This nut is of circular form and has turned in its exterior a groove, $j$.

I I are two elastic rods, both attached at one end to a block, J, which is bolted to the framing, and one of which having at its other end a screw, $g$, which is set at a right angle, and which passes through an eye, $h$, at the corresponding end of the other and is fitted with a nut, $i$, which can be turned by hand. These rods, screw, and nut constitute the friction-clamp, and are so arranged that the said rods enter the groove $j$ of the feeding-nut H, and, by screwing up the adjusting-nut $i$, are made to clamp the feeding-nut more or less tightly, thereby producing more or less friction upon it.

The feed of the drill will be produced by the rotation of the spindle $e$ within the nut H, the spindle, gate, gears, and driving-shaft F all descending together. The rapidity of the feed to the drill depends upon the tightness with which the rods I I clamp the nut H. When the said rods clamp this nut very lightly, it will be caused to rotate by the friction of the screw-thread $e$ within it almost as fast as the drill spindle itself, and consequently there will be very little speed given to the drill; but when the pressure and friction of the rods upon the said nut is increased by screwing up the nut $i$, the former nut, H, will not be permitted to rotate so rapidly, and the feed will be increased.

The drill is drawn out of the hole by simply reversing the rotary motion of the shaft F, and thereby reversing the rotary motion of the drill-spindle. The friction of the clamp upon the nut in this case, as in feeding, retarding, the rotation of the nut relatively to that of the spindle.

This mode of regulating the feed of the drill is found in practice to be more convenient than the modes heretofore commonly used.

What I claim as my invention, and desire to secure by Letters Patent, is—

The adjustable clamp and feeding-nut, combined with each other and with the drill-spindle, to operate substantially as and for the purpose herein described.

ALEXANDER GORDON.

Witnesses:
J. W. COOMBS,
GEO. W. REED.